United States Patent
Jeong et al.

(10) Patent No.: US 9,772,917 B2
(45) Date of Patent: Sep. 26, 2017

(54) METHOD AND APPARATUS FOR GENERATING TEST BENCH FOR VERIFICATION OF PROCESSOR DECODER

(71) Applicant: Samsung Electronics Co., Ltd., Suwon-si (KR)

(72) Inventors: Seong-hoon Jeong, Seoul (KR); Ho-young Kim, Seoul (KR); Soo-jung Ryu, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 180 days.

(21) Appl. No.: 14/259,481

(22) Filed: Apr. 23, 2014

(65) Prior Publication Data

US 2015/0100833 A1    Apr. 9, 2015

(30) Foreign Application Priority Data

Oct. 8, 2013    (KR) .................. 10-2013-0120195

(51) Int. Cl.
| | |
|---|---|
| G06F 11/00 | (2006.01) |
| G06F 11/22 | (2006.01) |
| G06F 11/263 | (2006.01) |
| G06F 11/36 | (2006.01) |

(52) U.S. Cl.
CPC ........ G06F 11/2236 (2013.01); G06F 11/263 (2013.01); G06F 11/3688 (2013.01)

(58) Field of Classification Search
CPC . G06F 11/2236; G06F 11/3688; G06F 11/263
See application file for complete search history.

(56) References Cited

U.S. PATENT DOCUMENTS

| | | | |
|---|---|---|---|
| 6,678,645 B1 | 1/2004 | Rajsuman et al. | |
| 7,730,435 B2 | 6/2010 | Pritchard et al. | |
| 8,065,128 B1 | 11/2011 | Chase | |
| 2003/0149949 A1* | 8/2003 | Price | G06F 17/5022 716/106 |
| 2003/0152149 A1* | 8/2003 | Denolf | H04N 19/42 375/240.24 |
| 2004/0133861 A1* | 7/2004 | Bollano | G06F 17/5045 716/102 |
| 2011/0087861 A1* | 4/2011 | Bertacco | G06F 11/263 712/202 |
| 2011/0161903 A1* | 6/2011 | Iwashita | G06F 17/5022 716/108 |
| 2012/0166774 A1* | 6/2012 | Tsuji | G06F 11/2236 712/227 |

FOREIGN PATENT DOCUMENTS

| | | |
|---|---|---|
| JP | 2000-163279 | 6/2000 |
| KR | 10-0491463 | 5/2005 |
| KR | 10-0536293 | 12/2005 |

\* cited by examiner

*Primary Examiner* — Charles Ehne
(74) *Attorney, Agent, or Firm* — Harness, Dickey & Pierce, P.L.C.

(57) ABSTRACT

A method and apparatus for generating a test bench for verifying a processor decoder are provided. The method including receiving an architecture description comprising processor decoder information, parsing the received architecture description into information for verifying the processor decoder, and generating the test bench to verify the processor decoder based on the parsed information.

17 Claims, 6 Drawing Sheets

FIG. 4

```xml
<!--Encoding Scheme-->
<endoding_scheme name="SCHEME_CRR_0" width="32">
  <opgcode name="groupcode"/>
  <opcode name="opcode_7"/>
  <src0 name="reg_pos0" type="reg"/>
  <src1 name="reg_pos2" type="reg"/>
  <dest0 name="reg_pos1"/>
  <stop name="stop_1"/>
</endoding_scheme>
<endoding_scheme name="SCHEME_CRI_0" width="32">
  <opgcode name="groupcode"/>
  <opcode name="opcode_4"/>
  <src0 name="reg_pos0" type="reg"/>
  <src1 name="imm_09" type="imm"/>
  <dest0 name="reg_pos1"/>
  <stop name="stop_1"/>
</endoding_scheme>

<!--Encoding Bit Map-->
<endoding_name="groupcode">
  <map orig="5" dest="31"/>
  <map orig="4" dest="30"/>
  <map orig="3" dest="29"/>
  <map orig="2" dest="28"/>
  <map orig="1" dest="27"/>
  <map orig="0" dest="26"/>
</endoding>
<endoding name="opcode_7">
<endoding name="reg_pos2">
<endoding name="reg_pos1">
<endoding name="reg_pos0">
<endoding name="stop_1">

<opgroup name="GROUP_CRR_0" vliw_groupcode="0x00" scheme="SCHEME_CRR_0">
  <op name="and32_c2c" opcode="0x20"/> <!--and32-->
</opgroup>
```

FIG. 5

```
include<stdio.h> int decode (int d1_instr)
{
   int d1_instr;
   int gpcode;
   int opcode;
   int reg_pos0;
   int reg_pos1;
   int reg_pos2;
   int stop_1;

switch (d1_instr&0xfc000000) {
      case 0:
         opcode=d1_instr&0x03f80000;
         reg_pos0=d1_instr&0x0007e000;
         reg_pos1=d1_instr&0x00001f80;
         reg_pos2=d1_instr&0x0000007e;
         stop_1=d1_instr&0x00000001;
         break;

case 1:
         opcode=d1_instr&0x03f80000;
         reg_pos0=d1_instr&0x0007e000;
         reg_pos1=d1_instr&0x00001f80;
         reg_pos2=d1_instr&0x0000007e;
         stop_1=d1_instr&0x00000001;
         break;
   }
}
```

METHOD AND APPARATUS FOR GENERATING TEST BENCH FOR VERIFICATION OF PROCESSOR DECODER

RELATED APPLICATIONS

This application claims the benefit under 35 USC 119(a) of Korean Patent Application No. 10-2013-0120195, filed on Oct. 8, 2013, in the Korean Intellectual Property Office, the entire disclosure of which is incorporated herein by reference for all purposes.

BACKGROUND

1. Field

The following description relates to methods and apparatuses for generating a test bench, and to methods and apparatuses for generating a test bench for verification of a processor decoder.

2. Description of the Related Art

As a plurality of processors are developed and verified, a plurality of test benches that correspond to a plurality of processors are used. As the number of processors that are developed increases, the number of test benches used for verifying the developed processors increases, which takes a long time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating a test bench to verify a processor decoder, the method including receiving an architecture description comprising processor decoder information, parsing the received architecture description into information for verifying the processor decoder, and generating the test bench to verify the processor decoder based on the parsed information.

The parsing of the received architecture description may include acquiring operation code (op-code) information, source information, and destination information from the received architecture description.

The op-code information may include an operation code specification, the source information comprises a source length, and the destination information comprises a destination length.

The architecture description may include at least one of encoding scheme information, encoding bitmap information, or op-code information.

The encoding scheme information may include group code information.

The processor decoder may be one of a very long instruction word (VLIW) processor decoder or a processor decoder having a coarse grained reconfigurable architecture (CGRA) structure.

The test bench may include a test vector.

The test bench may include a reference model of the processor decoder.

The method may include comparing results of inputting the test vector into the reference model and a design under test (DUT) processor decoder.

In another general aspect, there is provided an apparatus for generating a test bench to verify a processor decoder, the apparatus including a receiver configured to receive an architecture description comprising processor decoder information, a parser configured to parse the received architecture description into information for verifying the processor decoder, and a generator configured to generate the test bench to verify the processor decoder based on the parsed information.

The parser may be further configured to acquire operation code (op-code) information, source information, and destination information from the received architecture description.

The op-code information may include an operation code specification, the source information comprises a source length, and the destination information comprises a destination length.

The architecture description may include at least one of encoding scheme information, encoding bitmap information, or op-code information.

The encoding scheme information may include group code information.

The processor decoder may be one of a VLIW processor decoder or a processor decoder having a CGRA structure.

The test bench may include a test vector.

The test bench may include a reference model of the processor decoder.

The apparatus may include a comparator configured to compare results of inputting the test vector into the reference model and a design under test (DUT) processor decoder.

Other features and aspects will be apparent from the following detailed description, the drawings, and the claims.

BRIEF DESCRIPTION OF THE DRAWINGS

FIG. 4 is a diagram illustrating an example of information of an architecture description.

FIG. 5 is a diagram illustrating an example of a reference model of a processor decoder.

Figure 1:
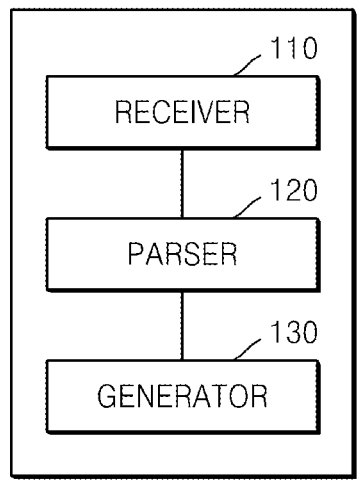
FIG. 1 is a diagram illustrating an example of an apparatus for generating a test bench for verifying a processor decoder.

Throughout the drawings and the detailed description, unless otherwise described, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The term "part" refers to a software element or a hardware element such as a field-programmable gate array (FPGA) or application-specific integrated circuit (ASIC) and performs roles but is not limited to software or hardware. The term "part" may be in a storage medium that may be addressed or may be constituted to reproduce one or more processors. The term "part" includes elements, such as, for example, software elements, object-oriented software elements, glass elements, task elements, processes, functions, attributes, procedures, subroutines, segments of a program code, drivers, firmware, micro-codes, circuits, data, database, data structures, tables, arrays, and parameters. Functions provided in elements and "parts" may be combined with the smaller number of elements and "parts" or may be divided into additional elements and "parts."

"Coarse Grained Reconfigurable Architecture" or "CGRA" may be a network that may be constituted together with several computing units and register files and may be connected to the several computing units and register files. Also, "Coarse Grained Reconfigurable Architecture" or "CGRA" is a combination of parallel processing hardware functionality and flexibility of software.

"Very Long Instruction Word" or "VLIW" is a method of processing several instructions, i.e., one of operation processing technologies for simultaneously executing several instructions.

In a scalar structure, a central processing unit (CPU) processes each instruction per clock cycle. An improvement of the scalar structure, a super scalar method may process two or more instructions simultaneously or in less than one clock cycle. The super scalar method divides a pipeline to use idle state hardware. As described above, a parallel operation structure simultaneously performs instructions, which do not overlap with each other, in parallel. Parts that wait for operations in a processor and that are in idle states are reduced to improve work efficiency and operation speed.

The VLIW refers to a method of performing a parallel operation by using instruction level parallelism (ILP) and including several simultaneously executable instructions, such as, for example, op-codes and operands, in a long instruction form to execute several operations whenever each of the instructions is withdrawn and executed. A instruction code is long but is regarded as one instruction. Therefore, the instruction code is withdrawn and decoded by one circuit, and only an execution cycle of each operation is simultaneously processed by several units (function units including an arithmetic logic unit (ALU)).

"Architecture description language" used herein is a language used to describe a software architecture that describes a structure and an operation of a software system that is a set of a software component, a connection point, and an interactive operation. A unit that models and parses the software architecture is provided to enhance a quality and accuracy of the software.

"Parsing" refers to a work that is involved in distinguishing elements, such as, for example, an operator, an operand, a keyword, which appear in a program. Parsing may be performed according to contents defined in syntax of a program and detecting structures of these elements, understanding a structure and job contents of the program input from a language interpreter such as a complier, an interpreter, or the like and translating the structure and the job contents into a machine language. "Parsing" may also refer to a job that is involved in distinguishing an instruction, a factor, or a parameter that is input by a user in an instruction processing apparatus to distinguish information input by the user.

"Instruction" refers to a command for executing an operation in a processor. A general processor expresses an instruction as 32 bits. However, the instruction is not limited to 32 bits and other number of bits, such as, for example, 64 bits, are considered to be well within the scope of the present disclosure.

FIG. 1 is a diagram illustrating an example of an apparatus 100 for generating a test bench for verifying a processor decoder. Referring to FIG. 1, the apparatus 100 includes a receiver 110, a parser 120, and a generator 130.

The receiver 110 may receive an architecture description including decoder information of a processor. The parser 120 may parse a language of the received architecture description into information to verify a decoder of the processor.

The decoder of the processor decodes an encoded instruction. The decoder separates the instruction including operation code (op-code) information, source information, and destination information from the received encoded information. Therefore, the encoded information refers to the decoded information that was received.

The generator 130 may generate a test bench for verifying the decoder of the processor by using the parsed information.

Figure 2:
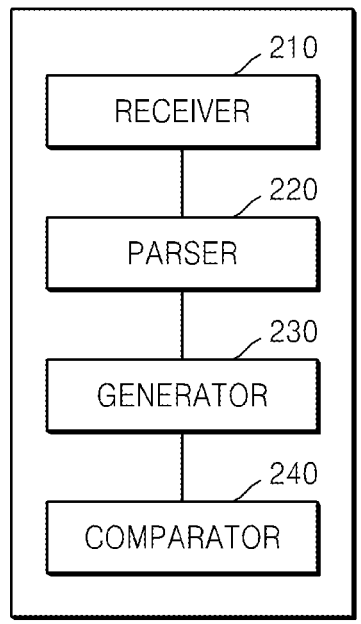
FIG. 2 is a diagram illustrating an example of an apparatus for generating a test bench for verifying a processor decoder.

FIG. 2 is a diagram illustrating an example of an apparatus 200 for generating a test bench for verifying a processor decoder. Referring to FIG. 2, the apparatus 200 includes a receiver 210, a parser 220, a generator 230, and a comparator 240.

The receiver 210 may receive an architecture description including decoder information of a processor.

The parser 220 may parse a language of the received architecture description as information to verify a decoder of the processor.

The received architecture description may include at least one of encoding scheme information, encoding bitmap information, or op-code information.

The encoding scheme information may include information about how an instruction is constituted.

The encoding bitmap information may include information about how many bits are allocated to each part of the instruction.

Structures of components of the encoding scheme information and the encoding bitmap information may be distinguished for parsing the language of the received architecture description to generate a test bench.

The generator 230 may generate the test bench using the parsed information. The test bench may include a test vector or a reference model of the decoder of the processor.

The comparator 240 may input the test vector of the apparatus 200 into the reference model and a design under test (DUT) processor decoder and compare the input results. The DUT processor decoder may include a very long instruction word (VLIW) processor decoder and a processor decoder having a coarse grained reconfigurable architecture (CGRA) structure.

Figure 3:
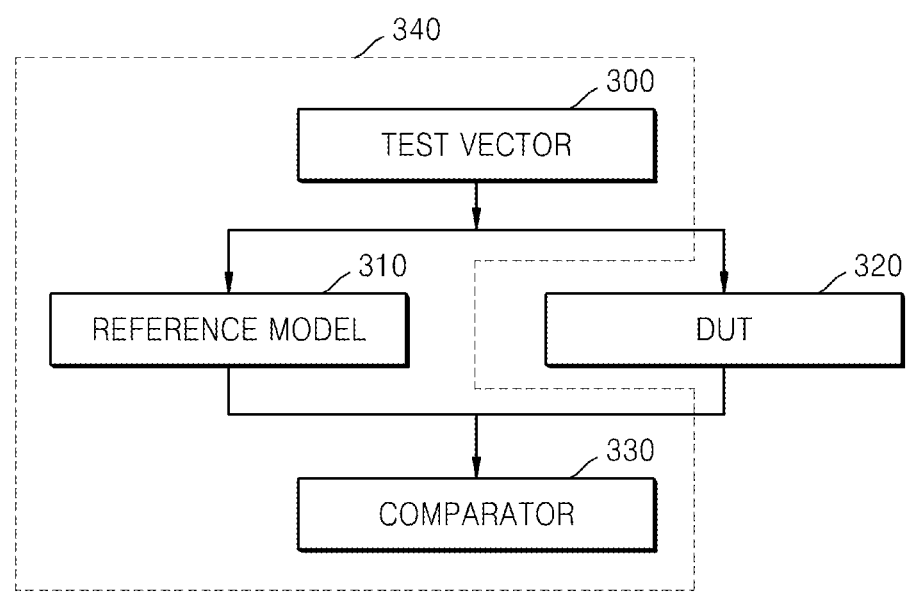
FIG. 3 is a diagram illustrating an example of a test bench for verifying a processor decoder.

FIG. 3 is a diagram illustrating an example of a test bench 340 for verifying a processor decoder. The test bench 340 may include a test vector 300 and a reference model 310 that are generated by the generator 230 of FIG. 2. The reference model 310 may correspond to the reference model 310 of a processor decoder to be verified. The test vector 300 is input into the reference model 310 and a DUT processor decoder 320.

The DUT processor decoder 320 may be selected by a user. An architecture description may be an architecture description of a DUT processor decoder. The architecture description may vary according to processors.

The comparator 330 compares a result of the test vector 300 passing through the reference model 310 with a result of the test vector 300 passing through the DUT processor decoder 320 to determine a pass and/or fail of a test.

FIG. 4 is a diagram illustrating an example of information of an architecture description.

Referring to FIG. 4, the information of the architecture description may include one of encoding scheme information, encoding bitmap information, or op-code information. The encoding scheme information may include group code information.

The information of the architecture description may be expressed in a language, such as, for example, C language or verilog language. The information of the architecture description is not limited to a type of a particular programming language. Other programming languages for describing the architecture are considered to be well within the scope of the present disclosure.

The encoding bitmap information may include information about how many bits are allocated to destination information.

The group code information may correspond to bits from a first bit to a sixth bit from the left of 32 bits of an instruction.

If "<src0 name="reg_pos0" type="reg"/>" is interpreted using the C language, a name of "source 0" may be expressed as "reg_pos0" on a decoder.

If "<src1 name="reg_pos2" type="reg"/>" is interpreted using the C language, a name of source 1 may be expressed as "reg_pos2" on the decoder.

If "<dest0 name="reg_pos1"/>" is interpreted using the C language, a name of destination 0 may be expressed as "reg_pos1" on the decoder.

If "<stop name="stop_1"/>" is interpreted using the C language, a name of a stop instruction may be expressed as "stop1" on the decoder.

FIG. 5 is a diagram illustrating an example of a reference model of a processor decoder. Referring to FIG. 5, the reference model of the processor decoder indicates which part of an instruction is an op-code and which part is a register, through information of an architecture description.

In a switch sentence realized in a C language, an operation is performed on an instruction and a part "fc000000" with code "&" to insert a group code as an input.

Since the part "fc000000" is hexadecimal numbers, the part "fc000000" may be expressed in binary numbers as "1111 1100 0000 0000 0000 0000 0000 0000." Therefore, first through sixth bits from the left of the instruction may be extracted as inputs.

The first through sixth bits from the left is a part that indicates a group code as shown in FIG. 4.

If 32 bits of the instruction is formed of "0000 0011 0100 0000 0000 0000 0000 0000", first through sixth bits from the left are all 0, and thus a group code may be 0. Therefore, if the group code is 0, case 0 is executed. If the group code is 1, case 1 is executed.

As seen from "opcode=d1_instr & 0x03f80000;" an operation may be performed on the instruction of 32 bits and "03f80000" with the code "&" to express an op-code.

"03f80000" is expressed as 16 numbers and may be expressed as binary numbers "0000 0011 1111 1000 0000 0000 0000 0000". In other words, seventh through 13th instructions from the left may indicate op-codes.

As seen from "reg_pos0=d1_instr & 0x0007e000;" an operation may be performed on the instruction of 32 bits and "0007e000" with the code "&" to express "reg_pos0" as a register address indicating a source.

"0007e000" is expressed as hexadecimal numbers and may be expressed as binary numbers "0000 0000 0000 0111 1110 0000 0000 0000". In other words, six bits of 14th through 19th instructions indicate "reg_pos0" as a register address indicating a source.

As seen from "reg_pos1=d1_instr & 0x00001f80;" an operation may be performed on an instruction of 32 bits and "00001f80" with the code "&" to express "reg_pos1" as a register address having information of a destination.

"00001f80" is expressed as hexadecimal numbers and may be expressed as binary numbers "0000 0000 0000 0000 0001 1111 1000 0000". In other words, six bits of 20th through 25th instructions from the left may indicate "reg_pos1" as a register address having information of a destination.

As seen from "reg_pos2=d1_instr & 0x0000007e;" an operation may be performed on an instruction of 32 bits and "0000007e" with the code "&" to express "reg_pos2" as a register address indicating a source.

"0000007e" is hexadecimal numbers and may be expressed as binary numbers "0000 0000 0000 0000 0000 0000 0111 1110". In other words, six bits of 26th through 31th instructions may indicate "reg_pos2" as a register address indicating a source.

As seen from "stop_1=d1_instr & 0x00000001;" an operation may be performed on an instruction of 32 bits and "00000001" with the code "&" to express "stop_1" as a register address.

"00000001" is expressed as hexadecimal numbers and may be expressed as binary numbers "0000 0000 0000 0000 0000 0000 0000 0001". In other words, one bit of a 32th instruction may indicate "stop_1" indicating information of a stop instruction.

As described above, all inputs for a decoder, including an op-code length, a source length, and a destination length of a processor, may be acquired.

Figure 6:
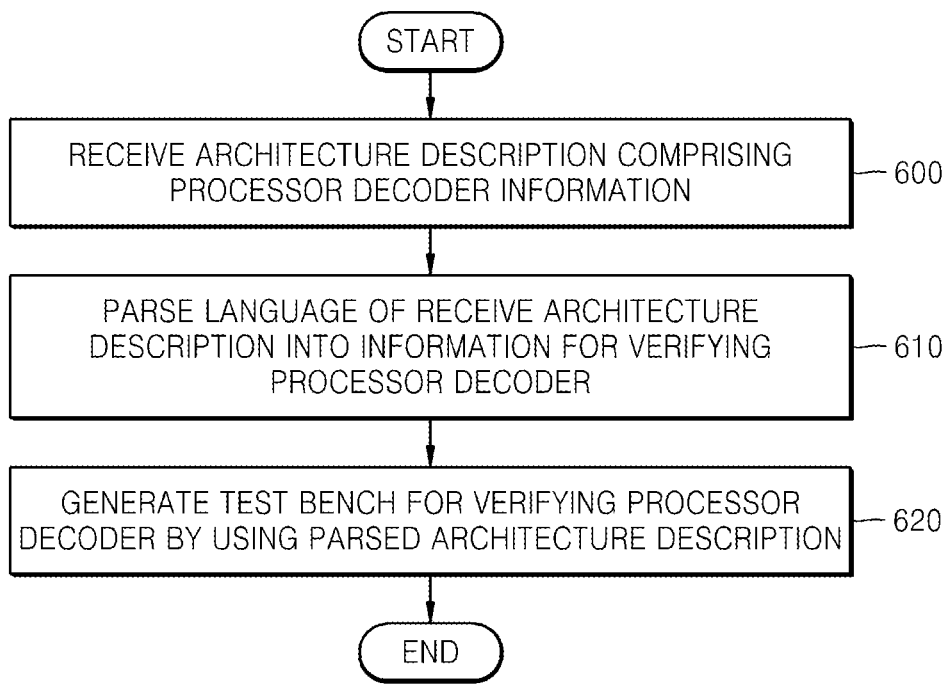
FIG. 6 is a diagram illustrating an example of a method of generating a test bench for verifying a processor decoder.

FIG. 6 is a diagram illustrating an example of a method of generating a test bench for verifying a processor decoder. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. Referring to FIG. 6, the method includes operations that are processed by the apparatus 100 of FIG. 1 in time series. Therefore, the descriptions of the apparatus 100 of FIG. 1 is included in the description of the method of FIG. 6, and will not be repeated here.

In operation 600, an architecture description including processor decoder information is received. Information about instruction encoding of a processor is included in the architecture description. The information about the instruction encoding of the processor is for compiling performed by a compiler. Since encoding information is the same as decoding information, the architecture description may include information about the processor decoder.

In operation 610, a language of the received architecture description is parsed into information for verifying the processor decoder. The language of the architecture description may not be used straight away to generate a test bench for verifying the processor decoder. To generate the test bench for verifying the processor decoder, the language of the architecture description may be parsed so that the information for verifying the processor decoder is appropriate for generating the test bench.

In operation 620, the test bench for verifying the processor decoder may be generated by using the parsed information. The test bench may include a test vector and a reference model of a DUT processor decoder. The test vector may be changed into another input and then inserted by a user and may include all inputs that may be inserted into the decoder.

Figure 7:
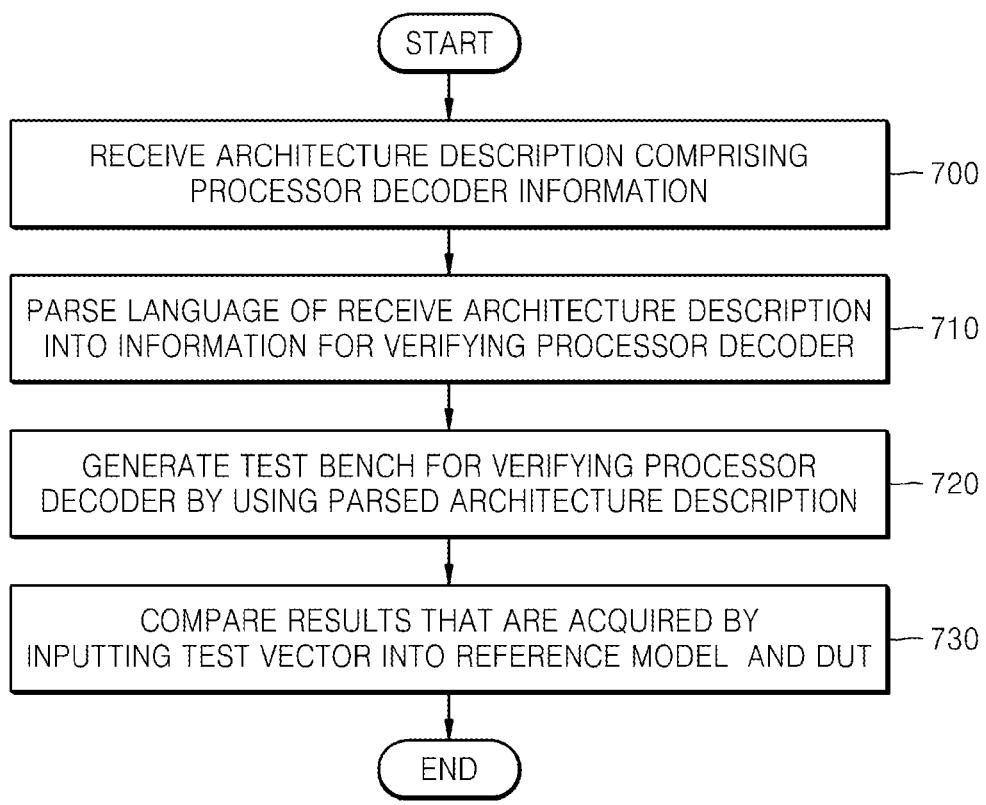
FIG. 7 is a diagram illustrating an example of a method of generating a test bench for verifying a processor decoder.

FIG. 7 is a diagram illustrating an example of a method of generating a test bench for verifying a processor decoder. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently.

Referring to FIG. 7, the method includes operations that are performed by the apparatus 200 of FIG. 2 in time series. Therefore, the descriptions of the apparatus 200 of FIG. 2 is included in the description of the method of FIG. 7, and will not be repeated here.

Operations 700, 710, and 720 are similar to operations 600, 610, and 620 of FIG. 6, and is incorporated herein by reference. Thus, the above description may not be repeated here.

In operation 730, results of inputting a test vector into a reference model and a DUT processor decoder may be compared.

The DUT processor decoder and the reference model receive the test vector to transmit outputs of the test vector. The outputs of the reference model and the DUT processor decoder may be compared to verify whether a processor decoder has failed or not. If the results are the same, the processor decoder may be passed. If the results are different, the processor decoder is deemed to have failed.

According to the one or more general aspect, a DUT processor decoder may be variously changed, but test benches may not need to be written for processor decoders through an input from a user. A test bench may be automatically written through a given architecture description to reduce a time for verifying all processor decoders. Information for generating the test bench may use the architecture description used by a compiler, and thus a time taken for the input from the user may be reduced.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a test bench to verify a processor decoder, the method comprising:
receiving an architecture description comprising processor decoder information, wherein the architecture description comprises at least one of encoding scheme information, encoding bitmap information, or operation code (op-code) information;

parsing the received architecture description into parsed information for verifying the processor decoder; and generating the test bench automatically to verify the processor decoder based on the parsed information.

2. The method of claim 1, wherein the parsing of the received architecture description comprises acquiring the op-code information, source information, and destination information from the received architecture description.

3. The method of claim 2, wherein the op-code information comprises an operation code specification, the source information comprises a source length, and the destination information comprises a destination length.

4. The method of claim 1, wherein the encoding scheme information comprises group code information.

5. The method of claim 1, wherein the processor decoder is one of a very long instruction word (VLIW) processor decoder or a processor decoder having a coarse grained reconfigurable architecture (CGRA) structure.

6. The method of claim 1, wherein the test bench comprises a test vector.

7. The method of claim 6, wherein the test bench comprises a reference model of the processor decoder.

8. The method of claim 7, further comprising comparing results of inputting the test vector into the reference model and a design under test (DUT) processor decoder.

9. A non-transitory computer-readable recording medium having recorded thereon a computer program for executing the method of claim 1.

10. An apparatus for generating a test bench to verify a processor decoder, the apparatus comprising:

a receiver configured to receive an architecture description comprising processor decoder information, wherein the architecture description comprises at least one of encoding scheme information, encoding bitmap information, or operation code (op-code) information;

a parser configured to parse the received architecture description into parsed information for verifying the processor decoder; and a generator configured to generate the test bench automatically to verify the processor decoder based on the parsed information.

11. The apparatus of claim 10, wherein the parser is further configured to acquire the op-code information, source information, and destination information from the received architecture description.

12. The apparatus of claim 11, wherein the op-code information comprises an operation code specification, the source information comprises a source length, and the destination information comprises a destination length.

13. The apparatus of claim 10, wherein the encoding scheme information comprises group code information.

14. The apparatus of claim 10, wherein the processor decoder is one of a VLIW processor decoder or a processor decoder having a CGRA structure.

15. The apparatus of claim 10, wherein the test bench comprises a test vector.

16. The apparatus of claim 15, wherein the test bench comprises a reference model of the processor decoder.

17. The apparatus of claim 16, further comprising:

a comparator configured to compare results of inputting the test vector into the reference model and a design under test (DUT) processor decoder.

* * * * *